(12) United States Patent
Rankin et al.

(10) Patent No.: US 6,382,694 B1
(45) Date of Patent: May 7, 2002

(54) THEFT DETERRENT SYSTEM FOR A MOTOR VEHICLE

(75) Inventors: Joseph D Rankin, Westland; William T Presley, Macomb Township, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/510,824

(22) Filed: Feb. 23, 2000

(51) Int. Cl.[7] ................................................. B60N 2/02
(52) U.S. Cl. ..................... 296/65.16; 296/68.1; 180/287
(58) Field of Search ........................... 296/65.16, 68.1; 180/287

(56) References Cited

U.S. PATENT DOCUMENTS

| | | | | |
|---|---|---|---|---|
| 4,101,169 A | * | 7/1978 | Muraisshi et al. | 297/341 |
| 4,116,297 A | * | 9/1978 | Ross et al. | 180/114 |
| 4,451,887 A | * | 5/1984 | Harada et al. | 264/424 |
| 4,822,101 A | * | 4/1989 | Hosoe | 297/379 |
| 4,942,746 A | * | 7/1990 | Monroy | 70/238 |
| 4,946,223 A | * | 8/1990 | Croft et al. | 297/367 |
| 4,997,223 A | * | 3/1991 | Croft | 297/367 |
| 5,213,388 A | * | 5/1993 | Baker | 296/65.1 |
| 5,251,465 A | * | 10/1993 | Hwang | 70/209 |
| 5,412,964 A | * | 5/1995 | Yee | 70/261 |
| 5,415,458 A | * | 5/1995 | Kim | 297/378.14 |
| 5,529,372 A | * | 6/1996 | Cohen | 297/217.3 |
| 5,628,215 A | * | 5/1997 | Brown | 70/261 |
| 5,683,140 A | | 11/1997 | Roth et al. | 297/344.1 |
| 6,048,019 A | * | 4/2000 | Tauber | 296/65.13 |

FOREIGN PATENT DOCUMENTS

| | | | |
|---|---|---|---|
| DE | 27 35 782 | * | 11/1978 |
| DE | 33 00 108 | * | 7/1984 |
| DE | 40 27 953 | * | 3/1992 |
| DE | 42 06 388 | * | 9/1993 |
| DE | 43 41 464 | * | 6/1995 |
| EP | 108 581 | * | 10/1983 |
| EP | 0 559 054 | * | 2/1993 |
| FR | 2 587 663 | * | 9/1985 |
| GB | 2 132 955 | * | 9/1982 |
| GB | 2 248 593 | * | 7/1990 |
| GB | 2 275 237 | * | 2/1993 |
| GB | 2 316 664 | * | 8/1996 |
| GB | 2 349 809 | * | 5/1999 |
| JP | 1 115758 | * | 5/1989 |

* cited by examiner

*Primary Examiner*—Ken Patel
(74) *Attorney, Agent, or Firm*—Edwin W. Bacon, Jr.

(57) ABSTRACT

The present invention provides a seating arrangement for a motor vehicle including a steering wheel, the seating arrangement includes a lower seat member, a seatback member and a theft deterrent system. The seatback member is coupled to the lower seat member for articulation between a first position and a second position such that the seatback member is oriented generally vertical in the first position and an upper portion of the seatback member is adapted to be disposed adjacent to the steering wheel when the seatback member is in the second position. The theft deterrent system is operative for selectively locking the seatback member in the second position.

8 Claims, 4 Drawing Sheets

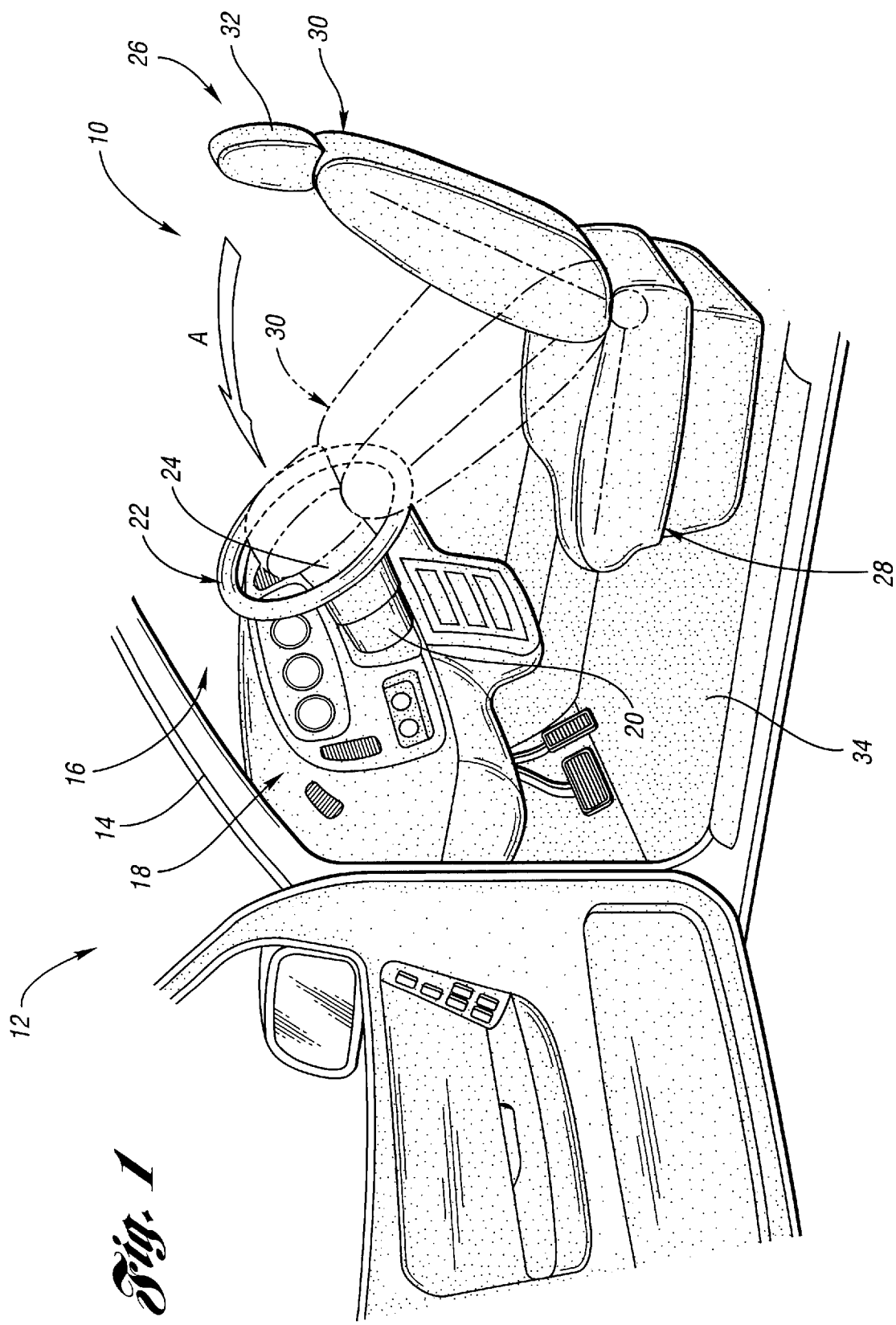

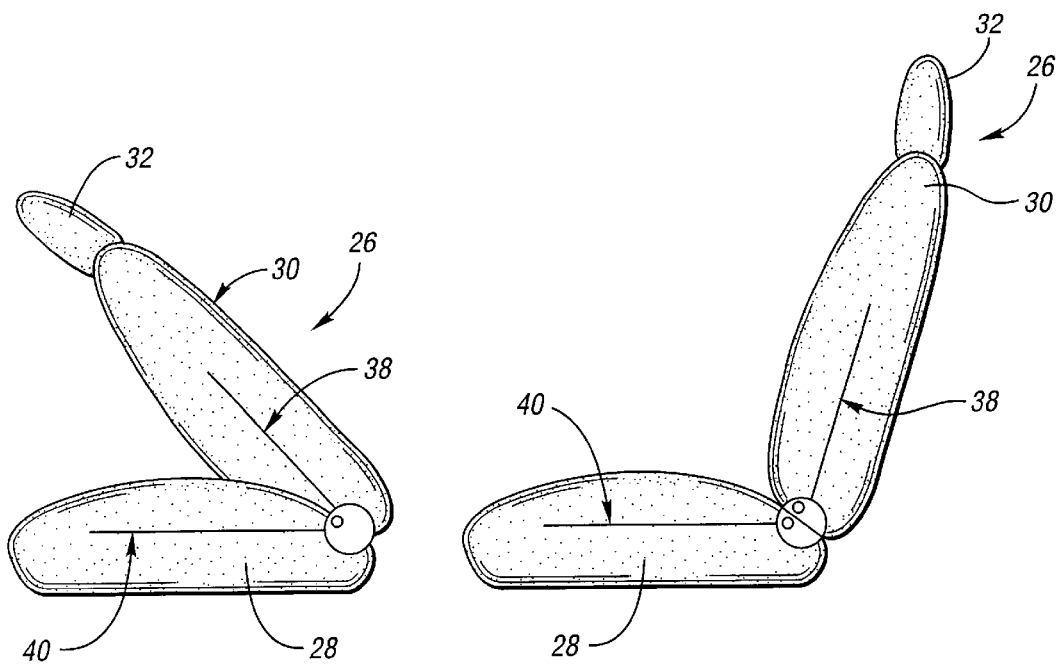
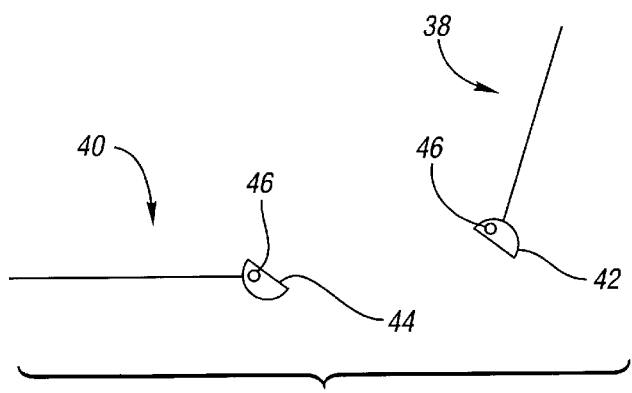
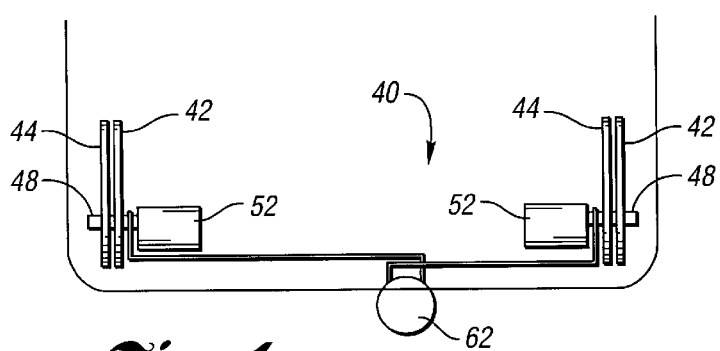

THEFT DETERRENT SYSTEM FOR A MOTOR VEHICLE

BACKGROUND OF THE INVENTION

1. Technical Field

The present invention generally relates to a theft deterrent system for a motor vehicle. More particularly, the present invention relates to a theft deterrent system for a motor vehicle which both renders the motor vehicle undrivable and prevents access to vehicle components such as air bags. More specifically, but without restriction to the particular embodiment and/or use which is shown and described for purposes of illustration, the present invention relates to a method and system of theft deterrent for a motor vehicle incorporating a seatback which locks in a forward position to prohibit access to the steering wheel.

2. Discussion

Numerous motor vehicle anti-theft devices are well known in the art. One such commonly known anti-theft device locks the steering column in place, preventing a perpetrator from steering the automobile while in place. Such devices are separate from and not a part of the motor vehicle, thus requiring the user to install the device prior to departing from the motor vehicle. Alarm type motor vehicle anti-theft devices are normally extremely sensitive and often inappropriately activated by weather conditions such as the wind.

Therefore, it is desirable to have a motor vehicle anti-theft device which prevents a perpetrator from driving the vehicle or accessing the airbag, is not commonly inappropriately activated and does not require user installation.

SUMMARY OF THE INVENTION

It is a general object of the present invention to provide a method and a system for deterring theft of a motor vehicle and/or airbag of the motor vehicle.

The present invention makes the theft of a vehicle and its components, particularly the airbag, more difficult. In one form of the present invention, the seatback, particularly the driver's side seatback, may be locked in its front folded position. Though most seatbacks may be articulated over the lower seat portion for comfort, the present invention functions to lock the seatback in a forward position such that access to the steering wheel for either driving the car or accessing the airbag is prevented.

In one particular form, the present invention provides a seating arrangement for a motor vehicle including a steering wheel, the seating arrangement includes a lower seat member, a seatback member and a theft deterrent system. The seatback member is coupled to the lower seat member for articulation between a first position and a second position such that the seatback member is oriented generally vertical in the first position and an upper portion of the seatback member is adapted to be disposed adjacent to the steering wheel when the seatback member is in the second position. The theft deterrent system is operative for selectively locking the seatback member in the second position.

In another form, the present invention provides a method of deterring theft of a motor vehicle and theft of an airbag of the motor vehicle. The method includes the following general steps:

providing a seating assembly including a lower seat member and a seatback member;

coupling the seatback member to the lower seat member for articulation between a first position and a second position such that the seatback member is oriented generally vertical in the first position and an upper portion of the seatback member is adapted to be disposed adjacent to a steering wheel of the motor vehicle when the seatback member is in the second position;

articulating the seatback member to the second position; and locking the seatback member in the second position.

BRIEF DESCRIPTION OF THE DRAWINGS

The present invention will become more fully understood from the detailed description and the accompanying drawings wherein:

FIG. 1 is an environmental view of the theft deterrent system constructed in accordance with the teachings of a preferred embodiment of the present invention, the system shown operatively incorporated into an exemplary vehicle.

FIGS. 2a and 2b are simplified views of a seating assembly of the present invention which is illustrated to include a seatback frame and seat cushion coupled for relative articulation, the seatback shown in a forward position and an upright position, respectively.

FIG. 3 is a simplified side view of the seatback frame and seat cushion frame shown exploded.

FIG. 4 is a simplified top view of a portion of the seating assembly of the present invention shown with a seatback articulated to a forward position and actuators locking the seatback in the forward position.

DETAILED DESCRIPTION OF THE PREFERRED EMBODIMENT

Figure 5:
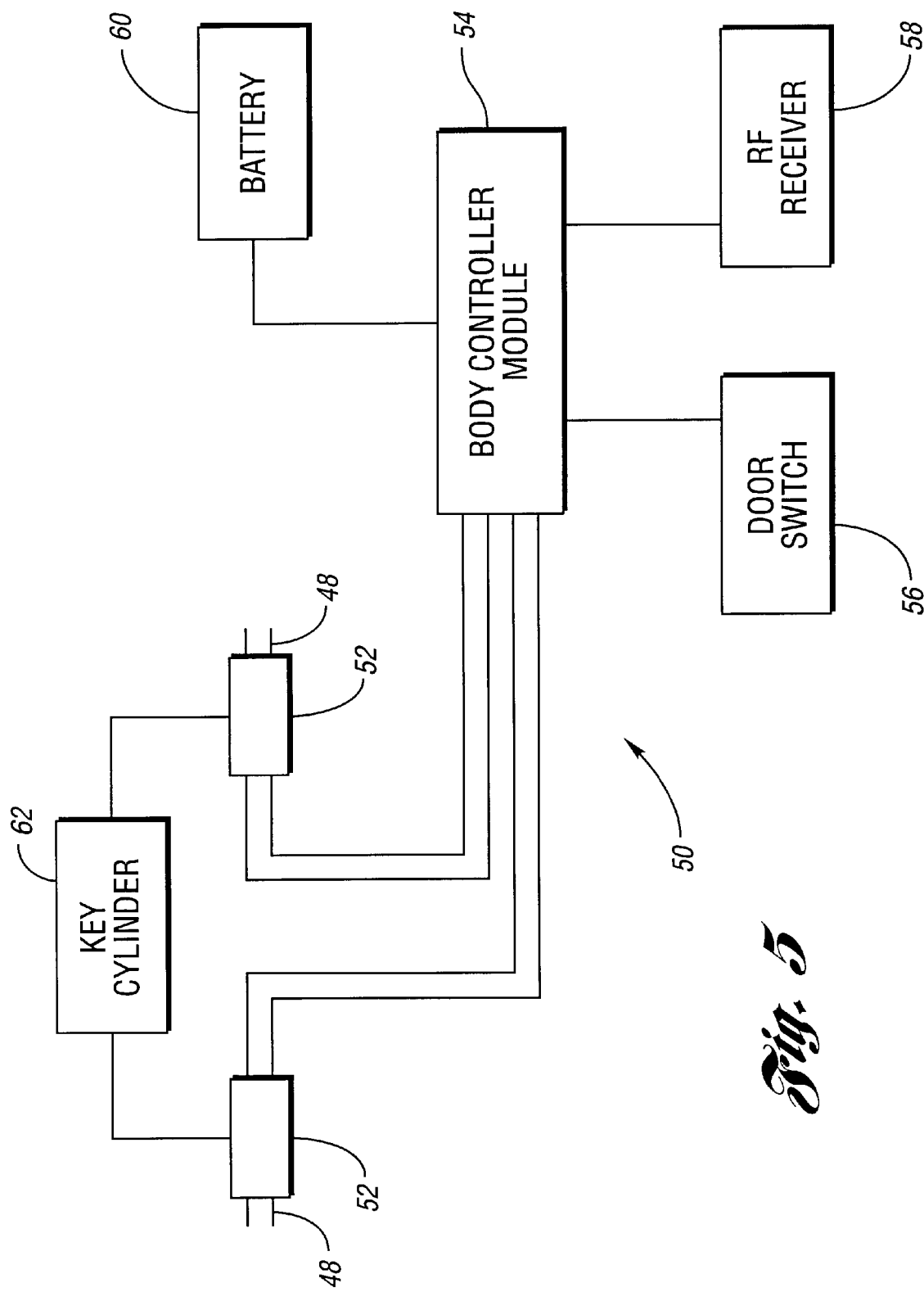
FIG. 5 is a schematic diagram illustrating the theft deterrent system of the present invention.

Turning first to the environmental view of FIG. 1, a theft deterrent system for a motor vehicle constructed in accordance with the teachings of the preferred embodiment of the present invention is shown and generally identified at reference numeral 10, The theft deterrent system 10 is illustrated operatively associated with a motor vehicle 12. As shown, the theft deterrent system 10 is operatively associated with the driver's side of a particular vehicle 12. It will become apparent to those skilled in the art that the teachings of the present invention are not limited to use with any particular vehicle. Furthermore it will be understood that the teachings of the present invention also have applicability to the passenger's side of the motor vehicle 12.

Prior to turning to the construction operation of the theft deterrent system 10 of the present invention, a brief understanding of conventional aspects of the motor vehicle 12 is warranted. The motor vehicle 12 is shown to include a body 14 defining a passenger compartment 16. An instrument panel 18 is mounted within the passenger compartment 16. A steering column 20 extends from the instrument panel 18 into the passenger compartment 16. A steering wheel is mounted at the end of the steering column 20. A driver's side airbag 24 is located within a central portion of the steering wheel 22.

With continued reference to FIG. 1 and additional reference to FIGS. 2–5, the theft deterrent system 10 of the present invention will further be described. The theft deterrent system 10 is shown embodied within a seating assembly 26 of the motor vehicle 12. The seating assembly 26 is positioned within the passenger compartment 16 to permit the seating of an occupant for steering and otherwise controlling travel of the motor vehicle 12. The seating assembly 26 is shown to include a lower seat member or seat cushion 28 and a seatback member 30. The seatback member 30 is conventionally coupled to the lower seat member 28 for articulation between a first position and generally upright position in which the seatback 30 is oriented generally vertical in a second position or forward position in which an upper portion or headrest 32 of the seatback member 30 is positioned adjacent the steering wheel 22. The first position is shown in the environmental view of FIG. 1 in solid lines. The second position is shown in FIG. 1 in broken lines. The particular pivot mechanism for articulably coupling the seatback member 30 and the lower seat member 28 is conventional in construction and need not be further described. The direction of articulation between the first position and the second position is identified in FIG. 1 with arrow A. The lower seat member 28 is conventionally mounted to a floor of the motor vehicle 12.

The theft deterrent system of the present invention is illustrated to include a first member 38 and a second member 40. As will become apparent below, the first and second members are adapted to articulate relative to one another. The theft deterrent system 10 of the present invention further includes a locking arrangement 42 for selectively preventing relative articulation between the first and second members 38 and 40.

In a preferred embodiment, the first member is a seatback frame 38 of the seatback member 30 and the second member is a lower frame 40 of the lower member 28. The seatback frame 38 and lower frame 40 include seatback and lower pivot plates 42 and 44, respectively. The pivot plates 42 and 44 are formed to each include a cooperating aperture 46. The apertures 46 are adapted to align when the seatback member 30 is in its second or forward position. Upon alignment, the cooperating apertures 46 receive a locking member 4B which thereby prevents relative articulation between the seatback frame 38 and the lower frame 40. As will be discussed below the locking members 48 are linearly translatable between engaged positions for preventing relative articulation and disengaged positions for permitting relative articulation.

With particular reference to the schematic view of FIG. 5, the theft deterrent system 10 of the present invention is illustrated to further include a control arrangement 50 for moving the locking members between their disengaged positions (shown in FIG. 5) and their engaged positions (shown in FIG. 4). The control arrangement 50 includes a pair of actuators 52, one of which is associated with each of the locking members 48. The locking members 48 are illustrated as extendable output spindles of the actuators 52. The spindles or locking members 48 are normally in their disengaged or retracted positions. The control arrangement includes a body control module 54 which receives signals from one or both of a door switch 56 and a radio frequency (RF) receiver 58. In response to a signal from the door switch indicating the door is looked or a locked command from a conventional keyless entry transmitter (not shown), the body control module 54 operates to linearly translate the spindles 48 from their disengaged positions to their engaged positions. For this purpose, the body control module is interconnected to the vehicle battery 60.

The control assembly 50 of the present invention further includes a key cylinder 62. The key cylinder is interconnected with the actuators 52. In the event of an electrical system failure, the key cylinder may be manipulated with the door key or alternatively the ignition key for purposes of retracting the spindles 48 to their disengaged positions.

In operation, when a vehicle occupant exits the vehicle 12, the seatback member 30 is manually articulated in a conventional manner to its second or forward position. Alternatively, it will be understood by those skilled in the art that the present invention may additionally incorporate a mechanical mechanism for driving the seatback member 30 to its second position. When the doors of the vehicle 12 are locked, the body control module 54 functions to linearly translate the spindles 48 with the actuators 52 to their engaged positions. In the event that the vehicle doors are locked, either through the door switch 56 or the keyless entry transmitter, the apertures 46 and the control plates 42 and 44 will not align, thereby preventing linear advancement of the spindles 48. Conversely, when the doors of the vehicle 12 are unlocked with the door switch 56 or keyless entry transmitter, the body control module 54 functions to retract the spindles 48 from their engaged positions.

Figure 6:
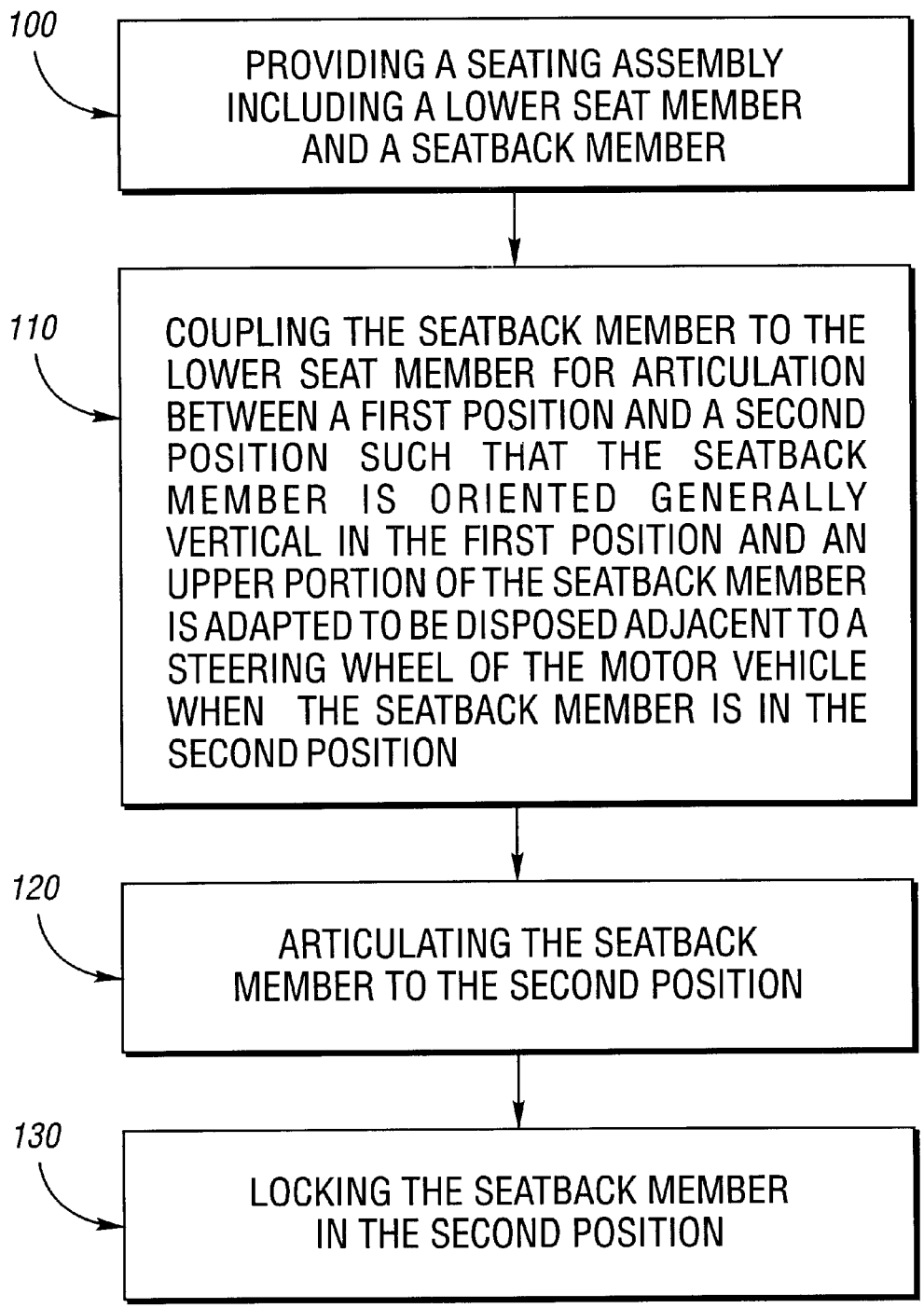
FIG. 6 is a schematic diagram illustrating the general steps of a preferred embodiment of the present invention.

Turning now to the schematic diagram of FIG. 6, the general steps of a preferred method of the present invention are set forth. In a first step 100, the method of the present invention includes providing a seating assembly including a lower seat member and a seatback member. In a second general step 110, the method of the present invention includes coupling the seatback member to the lower seat member for articulation between a first position and a second position such that the seatback member is oriented generally vertical in the first position and an upper portion of the seatback member is adapted to be disposed adjacent to a steering wheel of the motor vehicle when the seatback member is in the second position. In a third general step 120, the method of the present invention includes articulating the seatback member to the second position. In a fourth general step 130, the method of the present invention includes locking the seatback member in the second position.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A seating arrangement for a motor vehicle including a steering wheel, the seating arrangement comprising:
    a lower seat member;
    a seatback member coupled to the lower seat member for articulation between a first position and a second position such that the seatback member is oriented generally vertical in the first position and an upper portion of the seatback member is adapted to be disposed adjacent to the steering wheel when the seatback member is in the second position; and
    a theft deterrent system for selectively locking the seatback member in the second position, the theft deterrent system including:
        at least one locking member movable from a disengaged position to an engaged position for selectively preventing relative articulation between the lower seat member and the seatback member;

an actuator and a body controller unit for controlling the actuator to translate the locking member to selectively lock the seatback member in the second position; and a key cylinder coupled with the actuator for controlling the actuator to move the locking member to the disengaged position.

2. The seating arrangement of claim 1, wherein the at least one locking member comprises a spindle which is linearly translatable.

3. The seating arrangement of claim 1, wherein the theft deterrent arrangement further includes a radio frequency receiver for receiving a signal to control the body controller.

4. The seating arrangement of claim 1, wherein the seatback member and the lower seat member each include a plate defining apertures, the apertures adapted to align when the seatback is in the second position and receive the locking member.

5. A motor vehicle comprising:

a body defining a passenger compartment;

the passenger compartment including at least one seating arrangement and a steering wheel;

a seating unit mounted in the passenger compartment including:
- a lower seat cushion;
- a seatback coupled to the lower seat member for articulation between a first position and a second position such that the seatback member is oriented generally vertical in the first position and an upper portion of the seatback member disposed adjacent to the steering wheel when the seatback is in the second position; and
- a theft deterrent system for selectively locking the seatback member in the second position, the theft deterrent system further including:
  - at least one locking member movable from a disengaged position to an engaged position for selectively preventing relative articulation between the lower seat member and the seatback member;
  - an actuator and a body controller unit for controlling the actuator to translate the locking member to selectively lock the seatback member in the second position; and
  - a key cylinder coupled with the actuator for controlling the actuator to move the locking member to the disengaged position.

6. The motor vehicle of claim 5, wherein the at least one locking member comprises a spindle which is linearly translatable.

7. The motor vehicle of claim 5, wherein the theft deterrent arrangement further includes a radio frequency receiver for receiving a signal to control the body controller.

8. The motor vehicle of claim 5, wherein the seatback member and the lower seat member each include a plate defining apertures, the apertures adapted to align when the seatback is in the second position and receive the locking member.

* * * * *